Figure 3:
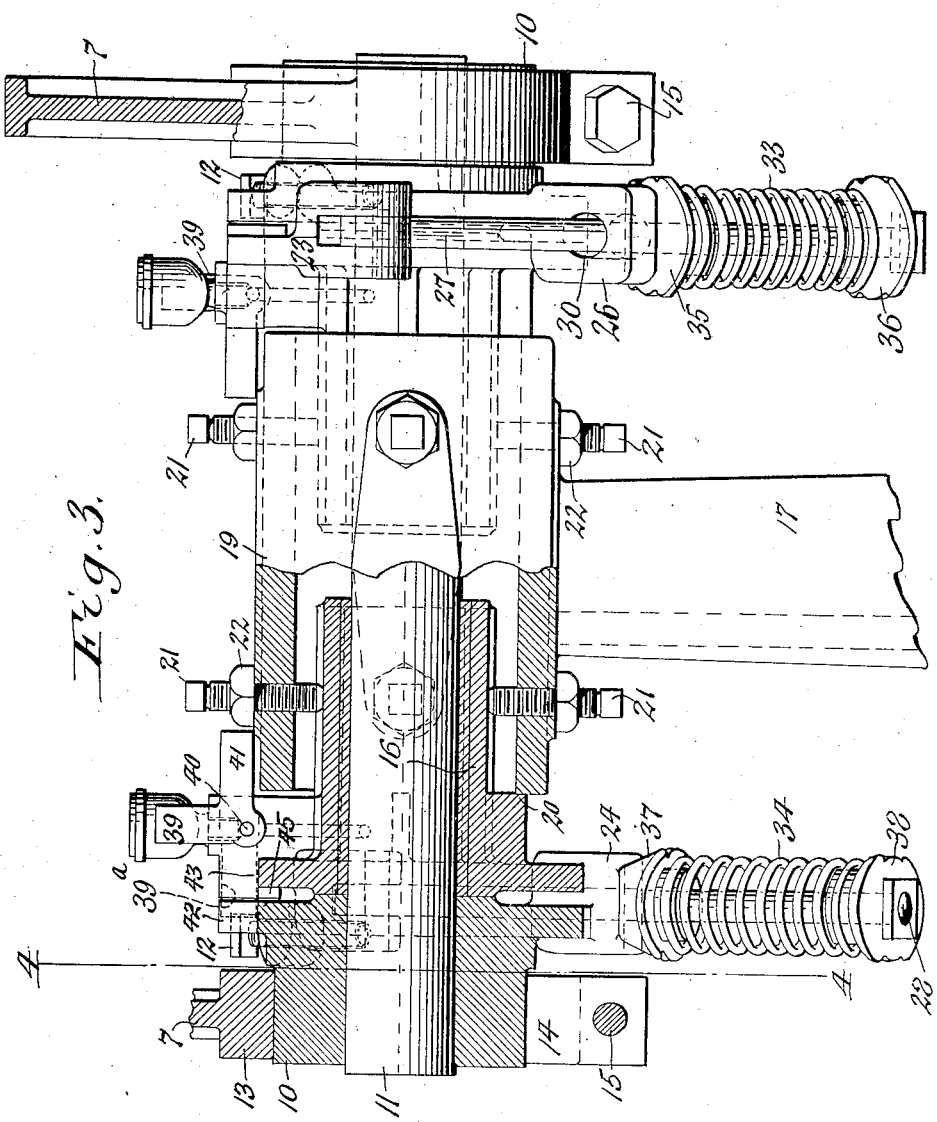

H. J. SMITH.
AUTOMATIC BELT TIGHTENER.
APPLICATION FILED OCT. 21, 1918.
1,348,905.
Patented Aug. 10, 1920.
5 SHEETS—SHEET 1.
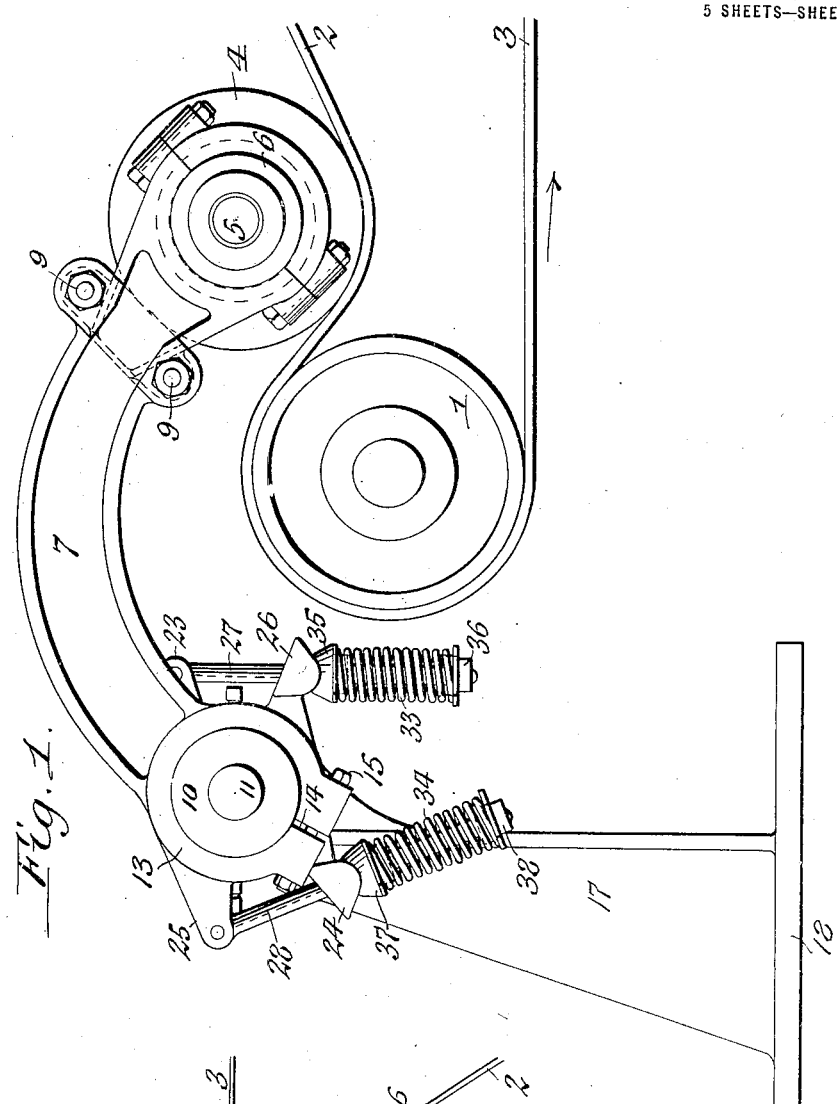
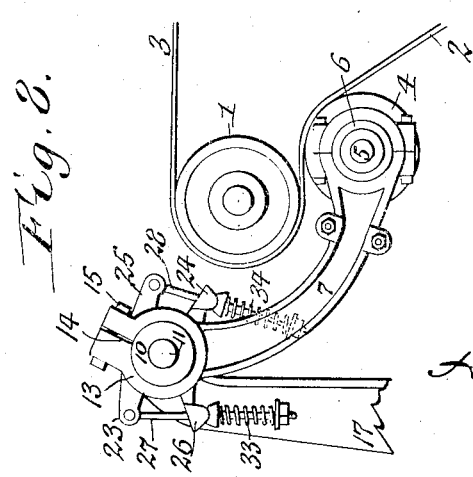
Inventor
Harry J. Smith
by Geyser & Popp
Attorneys

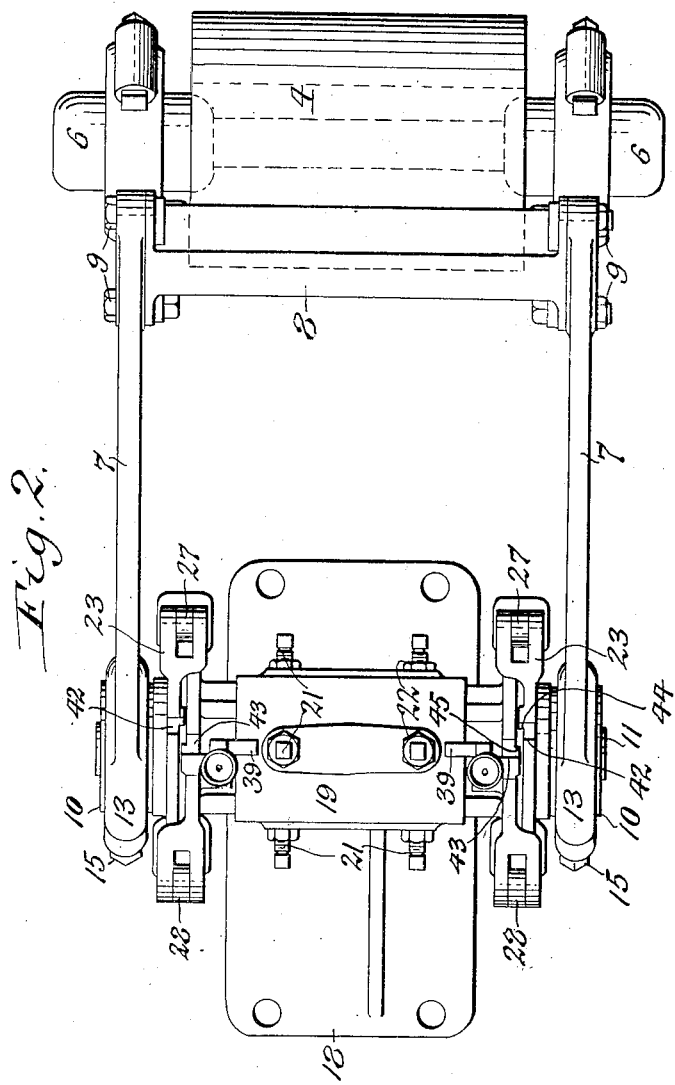

H. J. SMITH.
AUTOMATIC BELT TIGHTENER.
APPLICATION FILED OCT. 21, 1918.

1,348,905.

Patented Aug. 10, 1920.
5 SHEETS—SHEET 3.

Inventor
Harry J. Smith
by Dyer & Popp
Attorneys

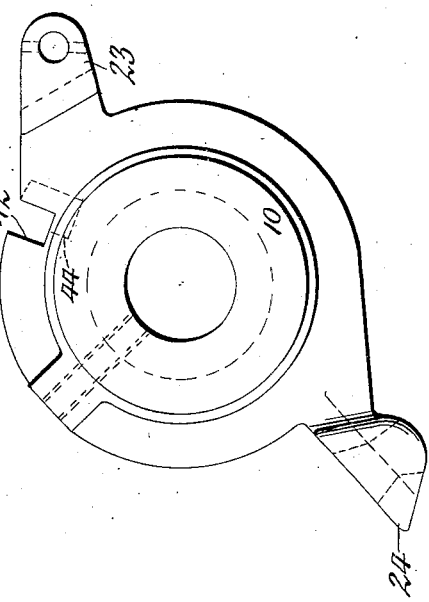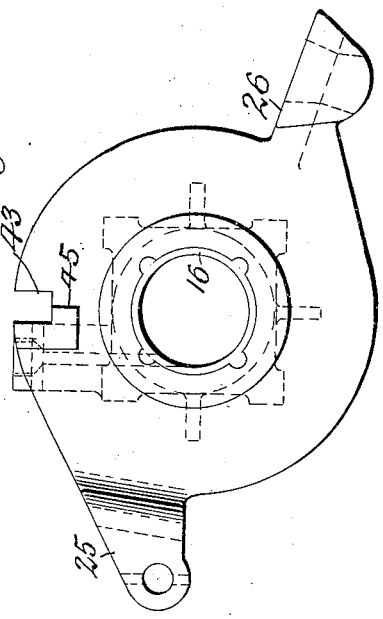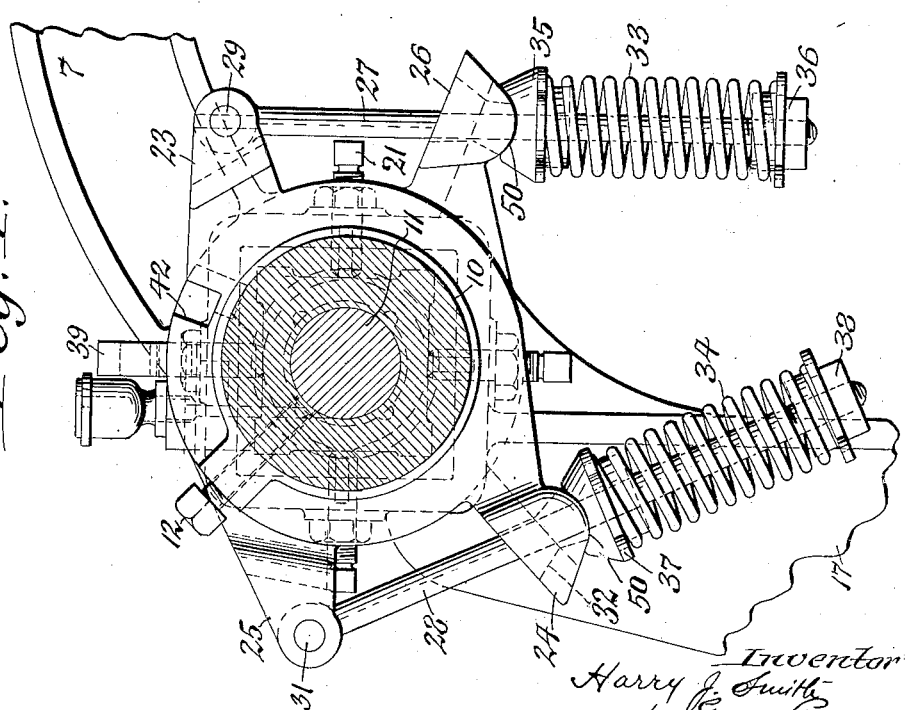

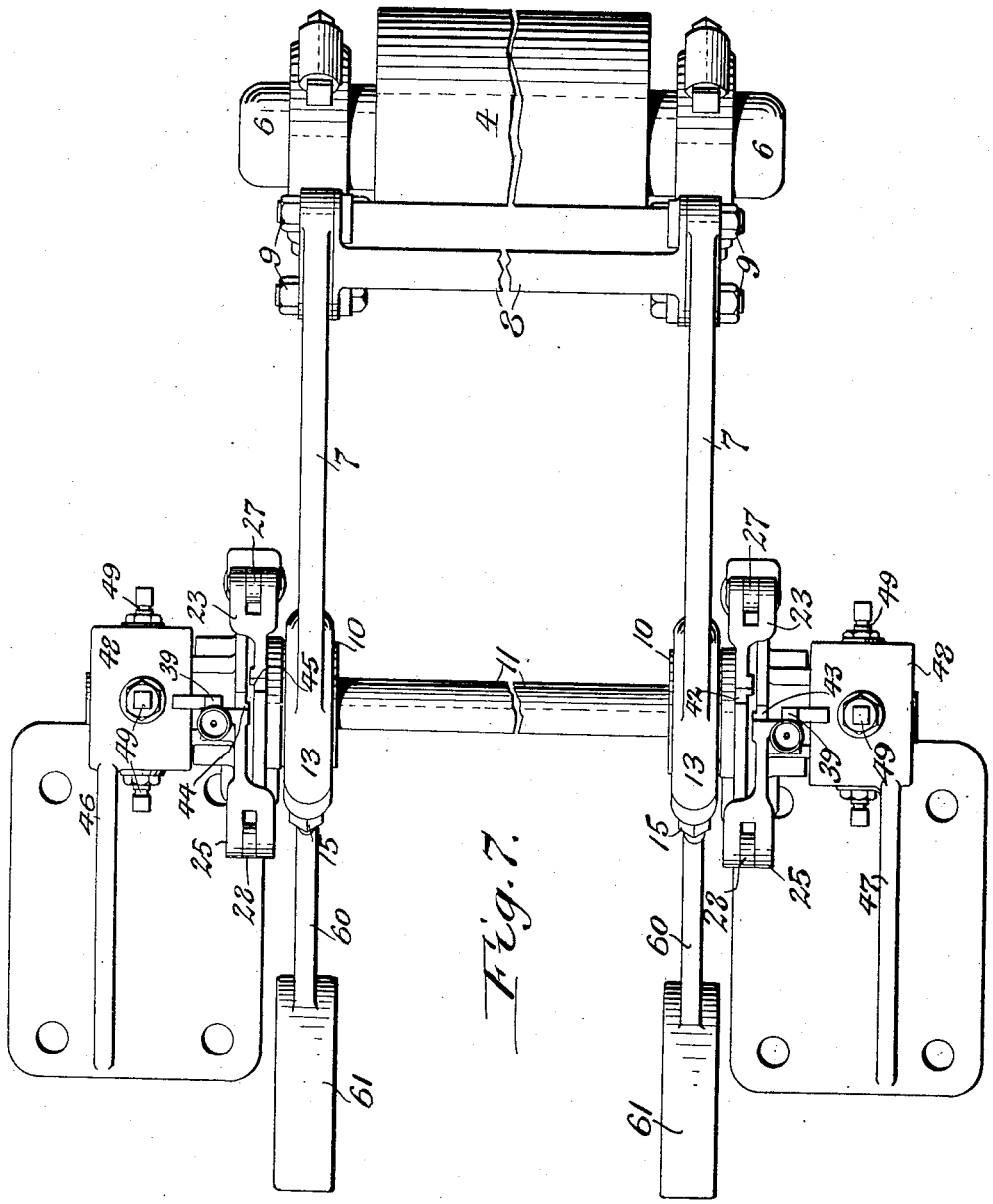

UNITED STATES PATENT OFFICE.

HARRY J. SMITH, OF LAKEWOOD, OHIO.

AUTOMATIC BELT-TIGHTENER.

1,348,905.  Specification of Letters Patent.  Patented Aug. 10, 1920.

Application filed October 21, 1918. Serial No. 259,108.

*To all whom it may concern:*

Be it known that I, HARRY J. SMITH, a citizen of the United States, residing in Lakewood, in the county of Cuyahoga and State of Ohio, have invented new and useful Improvements in Automatic Belt-Tighteners, of which the following is a specification.

This invention relates to a belt tightener which operates automatically to take up the slack of a belt and secure a greater arc of contact for the belt on the pulley while at the same time automatically compensating for the variable belt tensions due to differences in the load on the belt.

As is well known, the capacity of a belt so far as its driving effect is concerned, is directly dependent on the differential in the belt tensions. At rest, the tension in the operative or tight side and the tension in the inoperative or slack side of the belt are equal, but as soon as the belt is put in motion, the tension in the tight side increases and the tension in the loose side of the same decreases an equivalent amount, the difference at any time between these two tensions being an expression of the power transmitted. To secure the maximum driving effect of the belt, it is necessary to obtain the maximum friction reaction on the pulley around which the same is wrapped, this re-action being of larger or smaller amount according to the length of the arc of the belt on the pulley, so that under full load conditions all stretch and slack contained in the belt is eliminated from the tight side of the belt and absorbed by the slack side of the same.

It has heretofore been proposed to take out the slack on the inoperative side of the belt by means of pressure derived from a weight, but this is faulty by reason of the fact that the pressure produced by a weight is substantially constant and does not adapt itself to varying conditions which are present when a belt is at rest as compared with a belt which is in operation.

This invention therefore proposes the utilization of spring means as the motive agent for producing the necessary pressure against the slack side of a belt and it has for its object the provision of means of this character whereby spring-pressure is transmitted to the slack side of the belt in such manner that the pressure against the belt is greatest when the same is at rest and the arc of contact between the same and the pulley is shortest while the pressure against the belt is decreased when the same is in motion and is wrapped a greater extent around the pulley.

A further object of this invention is to provide a belt tightener which is comparatively simple in construction, capable of being readily adjusted and adapted to meet different conditions, and to so organize the same that it can be employed equally well for tightening the belt in a plus or minus direction and also to permit of manufacturing the same at low cost.

In the accompanying drawings: Figure 1 is a side elevation showing one embodiment of my invention in which the same operates to press the slack side of the belt in a plus direction. Fig. 2 is a top plan view of the same. Fig. 3 is a fragmentary vertical longitudinal section, on an enlarged scale, of the spring mechanism and associated parts of my improved belt tightener shown in Figs. 1 and 2. Fig. 4 is a vertical section taken on line 4—4, Fig. 3. Figs. 5 and 6 are detached elevations of one of the drums and bearings forming part of this invention. Fig. 7 is a top plan view showing a modified organization of my improvement. Fig. 8 is a side elevation of a belt tightener similar to Fig. 1 but showing the action of the mechanism reversed so as to operate in a minus direction.

Similar characters of reference refer to like parts throughout the several views.

1 represents a pulley which in the present instance will be assumed to be a driven pulley and 2, 3 the rear or slack side and the front or tight side of a belt passing around this pulley. 4 represents a take-up or tightener pulley or roller which engages with the outer surface of the slack side of the driving belt adjacent to the driven pulley and which is pressed against this side of the belt for the purpose of automatically taking up the slack therein under varying load conditions and to cause the same to be wrapped more or less around the driven pulley. This take-up pulley is mounted on a spindle 5 which is journaled at its opposite ends in bearings 6, 6 which are preferably of a self-oiling type. These spindle-bearings are mounted on the outer or front ends of two take-up or tightener rock arms 7, 7 which are arranged parallel and pivotally supported at their inner or rear ends so that the take-up pulley supported thereon swings in a path which intersects the slack side of the driving belt. The front parts of these tightener rock arms are held in their proper spaced relation by means of a separator or spacing bar 8 arranged transversely between these rock arms immediately in rear of the take-up pulley and connected at its opposite ends with the tightener rock arms by bolts 9, as shown in Figs. 1 and 2, or by any other suitable means.

Various means may be provided for pivotally supporting the tightener rock arms at their rear ends, those shown in the drawings being suitable and comprising two tubular drums or sleeves 10 which are secured to opposite ends of a rock shaft 11 by means of set screws 12 or otherwise, and each of which supports one of the tightener rock-arms. The preferred manner of mounting these tightener-arms on the supporting drums, as best shown in Figs. 1, 2 and 3, consists in providing each of the supporting drums on its outer part with a cylindrical peripheral surface which receives the correspondingly-shaped bore of the hub 13 at the inner end of one of the tightener-arms, this hub being split radially as shown at 14, and the parts of the same on opposite sides of this split being connected by a clamping screw 15 which permits the tightener arm to be adjusted circumferentially on the supporting drum for adapting the take-up pulley to different positions in which the driving belt and associated parts may be located with reference to the rock shaft 11.

The shaft 11 is preferably journaled in two bearings 16, 16 each of which receives this shaft adjacent to the inner side of one of the supporting drums. Any suitable means may be provided for carrying these bearings, but those which are shown in the drawings have been found satisfactory in practice, and the same comprise an upright standard 17 provided at its lower end with a base 18 which is adapted to be secured to a fixed part and at its upper end with a hollow or tubular head 19 through which the rock shaft passes and into opposite ends of which the opposing inner parts of the two bearings project. The entrance of these bearings into the supporting head is limited by engagement of inwardly-facing shoulders 20 on the periphery of these bearings engaging with the opposite ends of the supporting head, so that the outer parts of these bearings project beyond opposite ends of this head. These bearings are held rigidly in place within the supporting head and are also capable of being adjusted radially in various directions, so as to cause the take-up pulley to be properly presented to the driving belt and engage the same in the desired manner to secure the result required. The preferred means for thus securing these bearings adjustably in the supporting head comprise a plurality of set screws 21 which are arranged in threaded openings in the supporting head adjacent to opposite ends thereof and which engage the inner or contracted part of each bearing at different points about its circumference, preferably at four points which are arranged equidistant. The inner part of each bearing has its periphery preferably constructed substantially square or rectangular in cross section and each of the set screws 21 engages one of these flat peripheral surfaces of this bearing as shown by full lines in Fig. 3 and by dotted lines in Fig. 4, so that upon tightening the several screws against this bearing, the latter will be reliably held against axial as well as circumferential displacement with reference to the supporting head. By loosening the set screws on one side of the supporting head and tightening those on the opposite side, the bearings can be shifted laterally or tilted as much as may be necessary to bring the take-up pulley into the proper position relatively to the driving belt for securing the most effective operation of the device. After adjustment, each of the set screws is preferably held in place by means of a jam-nut 22 arranged on its outer part and engaging the outer side of the supporting head.

Associated with the opposing parts of each supporting drum and the companion bearing are spring means which operate to press the take-up or tightener pulley yieldingly against the slack side of the driving belt and as these spring means are identical in construction, the following description of one of them will therefore apply to both.

23 represents a coupling arm or lug arranged on the inner part of the supporting drum on the same side of the shaft from which the tightener arm projects and 24 an abutment arm or lug arranged on the inner end of this drum diametrically opposite said coupling arm, both this coupling arm and the abutment arm being movable circumferentially about the axis of the rock shaft 11 in unison with the same and the supporting drum and the parts connected therewith. On its outer end each of the bearings is provided on one side of its axis with a laterally projecting coupling arm 25 and on its diametrically opposite side with a laterally-projecting abutment arm 26, these last-mentioned coupling and abutment arms being normally fixed and incapable of rotary motion. The fixed coupling arm is arranged on that side of the axis of the shaft opposite to the movable coupling arm and coöperates with the movable abutment arm which is arranged on the corresponding side of the rock shaft, while the fixed abutment arm is arranged on that side of the axis of the shaft corresponding with the movable coupling arm with which this fixed abutment-arm coöperates. These several coupling and abutment arms are so arranged relatively to each other and the axis of the rock shaft that they practically form a cross with the coupling arms above and the abutment arms below the axis of this shaft, as best shown in Fig. 4.

27, 28 represent two tension rods, the front one 27 of which is pivotally connected at its upper end by means of a pin 29 with the movable coupling arm and passes downwardly through an opening 30 in the companion fixed abutment-arm while the other or rear rod 28 is pivotally connected at its upper end by means of a pin 31 with the fixed coupling arm 25 and passes downwardly through an opening 32 in the abutment arm 24. 33, 34 represent two tension springs of the helical type the front one 23 of which surrounds the lower part of the front tension rod and bears at its upper end against a spring retainer 35 which in turn engages with the underside of the fixed abutment-arm while its lower end bears against an adjusting screw nut 36 which engages with the lower threaded end of the front tension rod and is constructed in the form of a spring retainer, the other or rear spring 34 surrounding the lower part of the rear tension rod and bearing at its upper end against a spring retainer 37 which in turn engages the underside of the movable abutment arm while its lower end bears against an adjustable screw nut 38 arranged on the lower threaded end of the rear tension rod and constructed in the form of a spring retainer. The coöperating surfaces of each upper spring retainer and the companion abutment arm are preferably so constructed that a cylindrical swivel joint 50 is produced between the same so as to permit the tension rods and the parts associated therewith to rock on these abutment arms during the operation of the mechanism without causing any cramping or binding of the parts.

When the parts are thus assembled, the front springs 33 tend constantly to pull the front tension rods downwardly by reason of the front abutment arms being stationary and the front tension rods movable while the rear tension spring 34 tends constantly to push the rear abutment arms upwardly by reason of the latter being movable and the adjacent rear tension rod being stationary, thereby causing the tightener arms to be constantly moved in a direction for pressing the take-up pulley against the slack side of the driving belt and causing the latter to be held taut under different driving loads. By adjusting the screw nuts 36, 38, on the tension rods, the resilience of the springs may be adjusted to suit the particular requirements of the driving belt with which the tightener coöperates.

When originally installing this belt tightener, a moderate initial tension is placed on both the front and rear springs at which time the tightener arms may be unclamped from their drums. The latter are then temporarily held against turning by means of latches 39 each of which is pivoted by means of a transverse pin 40 to a lug on the outer part of one of the bearings and provided with a handle 41 where the latch may engage with a corresponding pair of locking notches 42, 43 in the peripheral parts of the opposing portions of the drum and bearing, as shown by dotted lines 39ᵃ in Fig. 3. The tightener arms are then turned into a position in which the take-up pulley or roller engages moderately with the slack side of the driving belt. The screw nuts 36, 38 are then tightened so as to flex the springs 33, 34 in accordance with the pressure it is desired to exert by the take-up roller against the driving belt after which the latches are thrown into their inoperative position, as shown by full lines in Fig. 3, whereby the drums are released and free to turn under the action of the tension springs for pressing the take-up pulley against the belt. If at any time it is desired to relieve the pressure of the tightener against the belt, this can be quickly done by throwing the tightener arms backwardly together with the associated parts until the locking notches of the tightener arms are in line with the latches, in which position the latter can be again engaged with these notches for holding the belt tightener in its inoperative position.

The backward movement of the tightener arms and associated parts is preferably limited or arrested when the locking notches of the drums and bearings are in line with each other ready to receive the latches, this being accomplished in the present construction by providing the opposing faces of each pair of drums and bearings with coöperating stops or shoulders 44, 45, as shown in Fig. 2. The forward movement of the tightener arm is limited when the take-up roller is not in engagement with the belt by engagement of the corresponding coupling and abutment arms, for which purpose these arms are offset laterally so as to bring them into the same plane. This offsetting of these arms also permits of arranging the tension rods and associated parts in a plane at right angles to the axis of the rock shaft so that a straight pull of the springs is produced for actuating the tightener arms and the parts mounted thereon.

Owing to a plurality of springs being employed in this automatic belt tightener, it is possible in the event of one spring becoming broken to make temporary repairs and retain the tightener in use until complete repairs can be made.

In the construction shown in Figs. 1, 2 and 3, a single standard is employed in the automatic belt tightener which is particularly suitable for narrow belts and in cases where the location of the standard in line with the take-up pulley would not interfere with the driving belt. When, however, this belt tightener is to be used on comparatively wide belts, or in an installation where the driving belt requires a clear space in line with the take-up pulley, then the single central standard is omitted and instead two separate standards 46, 47 are employed each of which is provided at its upper end with a hollow head 48 in which one end of one of the bearings is secured by means of a plurality of set screws 49 in substantially the same manner in which this is done in the construction shown in Figs. 2 and 3, the only difference being that in the construction shown in Fig. 7 the bearings and the tension devices are arranged on the outer sides of the tightener arms instead of between the inner sides thereof.

This improved belt tightener is applicable to driving belts which may be located in various positions and to any angular direction of belt approach and the same may also be used so as to produce a tightening effect either in a plus or in a minus direction. As shown in Fig. 1, the same is organized for operating in a plus direction, while in Fig. 8 the same is organized for operating in a minus direction. In order to utilize the belt tightener according to the last described method, it is only necessary to reverse the two sets of drums and bearings on opposite ends of the rock shaft so that the pulling effect of the spring means will be reversed, the construction being otherwise identical in every respect with that shown in Figs. 1-3.

Aside from securing a more uniform and reliable automatic tightening effect on the belt, this improved belt tightener can be made according to a standard design the parts of which can be made in quantities to meet different requirements, thereby avoiding the necessity of making a large number of patterns and keeping in stock an undue variety of parts to meet different conditions, whereby considerable economy in the cost of manufacture is effected.

If desired each of the tightener arms may be counterbalanced in addition to the counterbalancing effect of the spring device, particularly in those instances where the take-up pulley is arranged horizontally in line or nearly so, with the rock shaft. A practical way of accomplishing this as shown in Fig. 7, consists in providing the hub of each tightener arm with a weight arm 60 which projects laterally from the hub of each tightener arm opposite the latter and having a weight 61, said tightener arm, weight arm and weight being preferably formed integrally. By employing these weights in connection with the spring device the action of the latter in some installations is rendered more sensitive.

I claim as my invention:

1. A belt tightener comprising a rock arm, a pulley mounted on said arm and adapted to engage a belt, a rotatable drum upon which said arm is mounted and upon which said arm is adjustable circumferentially, and a spring operatively associated with said drum and a fixed part and adapted to turn said arm in a direction for pressing said pulley against said belt.

2. A belt tightener comprising a rock arm, a pulley mounted on said arm and adapted to engage a belt, a rotatable drum upon which said arm is mounted and upon which said arm is adjustable circumferentially, a shaft to which said drum is secured, a bearing in which said shaft turns, and spring means associated with said drum and bearing and operating to turn said arm in a direction for pressing said pulley against said belt.

3. A belt tightener comprising a rock arm, a pulley mounted on said arm and adapted to engage a belt, a rotatable drum upon which said arm is mounted and upon which said arm is adjustable circumferentially, a shaft to which said drum is secured, a bearing in which said shaft turns, spring means associated with said drum and bearing and operating to turn said arm in a direction for pressing said pulley against said belt, and a standard on which said bearing is mounted.

4. A belt tightener comprising a presser rock arm provided at its inner end with a hub, a pulley mounted on the outer end of said arm and adapted to engage a belt, a rotatable drum provided with a cylindrical neck upon which the hub of said arm is secured for circumferential adjustment thereon, a shaft to which said drum is secured, a bearing in which said shaft is journaled, and spring means associated with said drum and bearing and operating to press said pulley against said belt.

5. A belt tightener comprising a presser rock arm provided at its inner end with a hub, a pulley mounted on the outer end of said arm and adapted to engage a belt, a rotatable drum provided with a cylindrical neck upon which the hub of said arm is secured for circumferential adjustment thereon, said drum and bearing being provided with coöperating stops for limiting the movement of said arm in a direction in which said pulley moves away from said belt.

6. A belt tightener comprising a presser rock arm provided at its inner end with a hub, a pulley mounted on the outer end of said arm and adapted to engage a belt, a drum provided with a cylindrical neck upon which the hub of said arm is secured for circumferential adjustment thereon, and also provided on diametrically opposite sides with a coupling arm and an abutment arm, a shaft to which said drum is secured, a bearing in which said shaft turns and which is provided on one side with a coupling arm which is arranged adjacent to the abutment arm of said drum and on its opposite side with an abutment arm which is arranged adjacent to the coupling arm of the drum, tension rods each pivoted at one end to one of said coupling arms and passing through the corresponding abutment arm, and springs each surrounding one of said tension rods and supported at its inner end on the companion abutment arm and at its outer end on the outer end of the respective tension rod.

7. A belt tightener comprising a presser rock arm provided at its inner end with a hub, a pulley mounted on the outer end of said arm and adapted to engage a belt, a drum provided with a cylindrical neck upon which the hub of said arm is secured for circumferential adjustment thereon, and also provided on diametrically opposite sides with a coupling arm and an abutment arm, a shaft to which said drum is secured, a bearing in which said shaft turns and which is provided on one side with a coupling arm, which is arranged adjacent to the abutment arm of said drum and on its opposite side with an abutment arm which is arranged adjacent to the coupling arm of the drum, retaining blocks engaging with said abutments by swivel joint tension rods each connected at its inner end with one of said coupling arms and passing through the corresponding abutment arm and retaining block, a retaining screw nut arranged on the outer end of each tension rod, and springs surrounding each tension rod bearing at their inner and outer ends against the corresponding retaining block and screw nut.

8. A belt tightener comprising a presser arm, a pulley mounted on said arm, a rotatable drum on which said arm is mounted and upon which said arm is adjustable circumferentially, a shaft to which said drum is secured, a bearing in which said shaft is journaled, spring means associated with said drum and bearing for pressing said pulley against a belt, and locking means for holding said drum and associated parts temporarily against rotary movement relative to said bearing.

9. A belt tightener comprising a presser arm, a pulley mounted on said arm, a rotatable drum on which said arm is mounted and upon which said arm is adjustable circumferentially, a shaft to which said drum is secured, a bearing in which said shaft is journaled, spring means associated with said drum and bearing for pressing said pulley against a belt, and locking means for holding said drum and associated parts temporarily against rotary movement relative to said bearing comprising a latch pivoted on said bearing and movable into and out of engagement with a locking notch in said drum.

10. A belt tightener comprising a presser arm, a pulley mounted on said arm, a rotatable drum on which said arm is mounted and upon which said arm is adjustable circumferentially, a shaft to which said drum is secured, a bearing in which said shaft is journaled, and a standard on which said bearing is adjustable in a radial direction relatively to the axis of said shaft.

11. A belt tightener comprising a presser arm, a pulley mounted on said arm, a rotatable drum on which said arm is mounted and upon which said arm is adjustable circumferentially, a shaft to which said drum is secured, a bearing in which said shaft is journaled and which is provided with a laterally projecting shank, a standard having a socket which receives said shank, and radial adjusting screws mounted on said standard and engaging circumferentially with different parts of said shank.

HARRY J. SMITH.